United States Patent [19]

Kauss et al.

[11] 4,283,087
[45] Aug. 11, 1981

[54] SUPPORT UNIT FOR A DRIVER'S CAB IN A UTILITY VEHICLE

[75] Inventors: Wolfgang Kauss, Berlin; Ludwig Muncke, Feldkirchen-Westerham, both of Fed. Rep. of Germany

[73] Assignee: Fritzmeier AG, Lenzburg, Switzerland

[21] Appl. No.: 102,661

[22] Filed: Dec. 12, 1979

[30] Foreign Application Priority Data

Dec. 13, 1978 [DE] Fed. Rep. of Germany ....... 2853806

[51] Int. Cl.³ ............................................. B62D 33/06
[52] U.S. Cl. .................. 296/190; 180/89.12; 280/DIG. 1
[58] Field of Search ...................... 296/190; 180/89.12, 180/89.13; 280/DIG. 1, 703, 714

[56] References Cited

U.S. PATENT DOCUMENTS

| 3,145,032 | 8/1964 | Turek | 280/DIG. 1 |
|---|---|---|---|
| 3,195,877 | 7/1965 | Cislo | 280/DIG. 1 |
| 3,944,017 | 3/1976 | Foster | 296/190 |
| 3,966,009 | 6/1976 | Mencock et al. | 296/190 |

FOREIGN PATENT DOCUMENTS 1555946 4/1978 Fed. Rep. of Germany .......... 296/190

*Primary Examiner*—David M. Mitchell
*Assistant Examiner*—Ross Weaver
*Attorney, Agent, or Firm*—Jay L. Chaskin

[57] ABSTRACT

The invention provides a support unit for drivers' cabs which actively compensates for any relative movement between chassis and cab by providing at least one support cylinder which is axially rigidly mounted on the chassis with its support piston and flexibly supported on the cab by its cylinder, the cylinder forming a movement-producing unit with a directional control valve whose body alternately connects the front side of the support piston to the pressure side of a constant-pressure circuit or to a non-pressurized outlet and is attached to the cab.

9 Claims, 2 Drawing Figures

SUPPORT UNIT FOR A DRIVER'S CAB IN A UTILITY VEHICLE

For the sake of greater comfort driver's cabs are normally spring-loaded relative to the vehicle chassis in order to protect the driver from strong vibrations, such as those transmitted by tractor axles which are not fitted with springs. Such spring suspension systems, acting as passive springing, inevitably lead to movements of the cab relative to the chassis which can be damped, but which are nevertheless noticeable to the user of the cab and can impair safe driving.

The present invention is directed to a support unit for drivers' cabs which actively compensates for any relative movement between chassis and cab and in this way keeps the cab substantially free of movement without the occurrence of rocking or wobbling.

According to one embodiment of the invention fluid is drained from or admitted to an adjusting cylinder in the event of a relative movement between the cab and cylinder so that, depending on whether a vehicle drives over a pot-hole or rising ground, the cylinder is lengthened or shortened in order to maintain the cab at the same height. At least three of these support units should be provided for optimum support of a cab. The constant-pressure circuit should simply be designed so as to supply at all times the necessary quantities of hydraulic fluid to be discharged. This constant-pressure circuit can be easily maintained in a fully loaded state by the hydraulic system of the utility vehicle. A constant-pressure circuit has a better operating capacity than a unidirectional flow circuit, the hydraulic accumulator associated with a constant-pressure circuit easily ensuring the high specific flow of energy required for supporting a cab. If a tractive vehicle has a constant-pressure servo brake system or even a constant-pressure trailer braking system, the loading valve necessary for this system can also supply the constant-pressure circuit of the support unit. The operating time of the circuit can be optimized by fitting small hydraulic accumulators directly to the support unit.

Preferably the support unit also compensate for the relative movement between cab and chassis resulting from static spring deflection when the user climbs into the cab.

The invention will be explained in more detail below with the aid of schematic drawings of a practical embodiment wherein.

Figure 1:
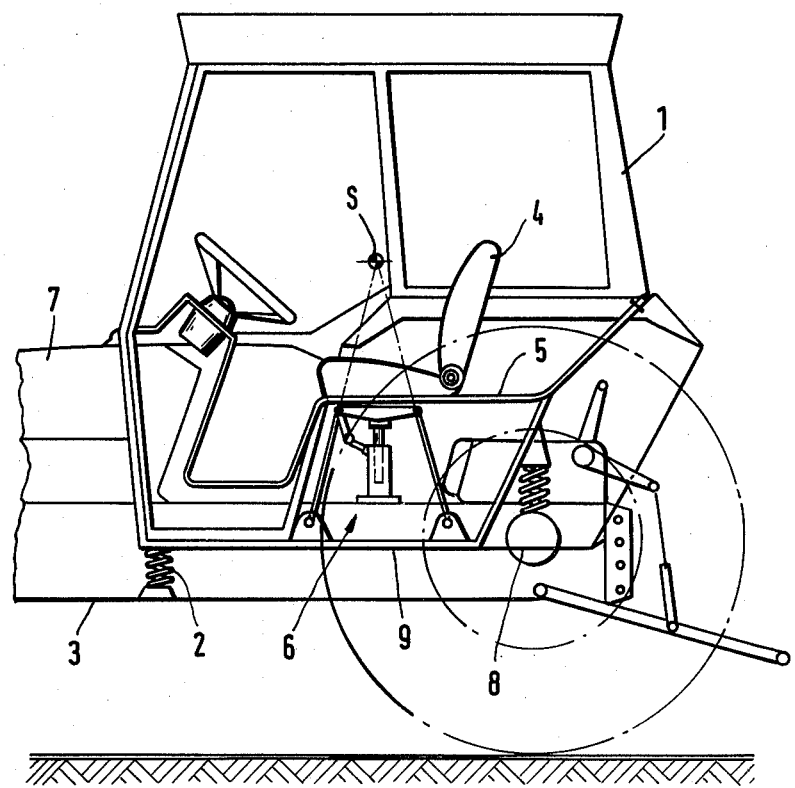
FIG. 1 shows, in side elevation, a tractor cab as a preferred field of application for a support unit according to the invention.

The tractor shown in FIG. 1 comprises a self-supporting driver's cab 1 which is supported on the tractor chassis by support units 2 according to the invention. Below the driver's seat inside the cab the cab floor 5 is raised as far as the bottom edge of the seat so that below the seat and outside the cab space is provided for a guide mechanism 6 designed in the present case so that the cab can only execute movements about the centre of gravity S of the tractor body which is situated inside the cab above the driver's seat 4.

Preferably four support units 2 are provided for supporting the cab 1, namely, two at the front end of the cab on either side of the hood 7 and two at the rear supported on the rear wheel axle 8.

The support unit 2 according to the invention comprises a support cylinder 10 which is supported on the floor 9 of the driver's cab 1 by a spring element 11 and on the chassis 3 of the tractor by the piston rod 12 of its support piston 13 so that angular movements about the lower point of support 14 are possible, but not axial movement. Rigidly connected to the support cylinder 10 is the body or housing 15 of a directional control valve 16 for receiving a piston slide valve capable of occupying the three positions A, B and C. With the aid of this piston slide valve 17 the front side 18 of the supporting piston, connected to the housing 15 by an outlet 19, can be connected to a constant-pressure circuit 20 or a non-pressurized return tank 21 which is connected to the housing 15 by the return line 22. The constant-pressure circuit comprises a hydraulic accumulator 23 which is supplied by a constant-pressure pump 26 via a pressure line 24 and a non-return valve 25. The hydraulic accumulator 23 is connected to the valve housing 15 by an inlet or admission pipe 27. The directional control valve 16 operates in such a way that in position B it prevents flow between outlet 19 and the inlet 27 and return line 22, in position A it connects the inlet pipe 27 to the outlet 19 and, in position C, connects the latter to the return line 22. The piston slide valve 17 is supported on a two-armed lever 30 having a pivot 31 on the chassis and its first arm 32 connected to the piston slide valve 17 by a linkage 33. The second lever arm 34 is connected to the piston 36 of an adjusting cylinder 37 by a joint 35. Like the housing 15 of the directional control valve 16, cylinder 38 of adjusting cylinder 37 is connected to the supporting cylinder 10 to form a unit, the working area 39 of its piston 40 being connected to the outlet 19 by an adjustable throttle 41. A spring 42 is located within cylinder 38 on the non-working side of piston 40.

Figure 2:
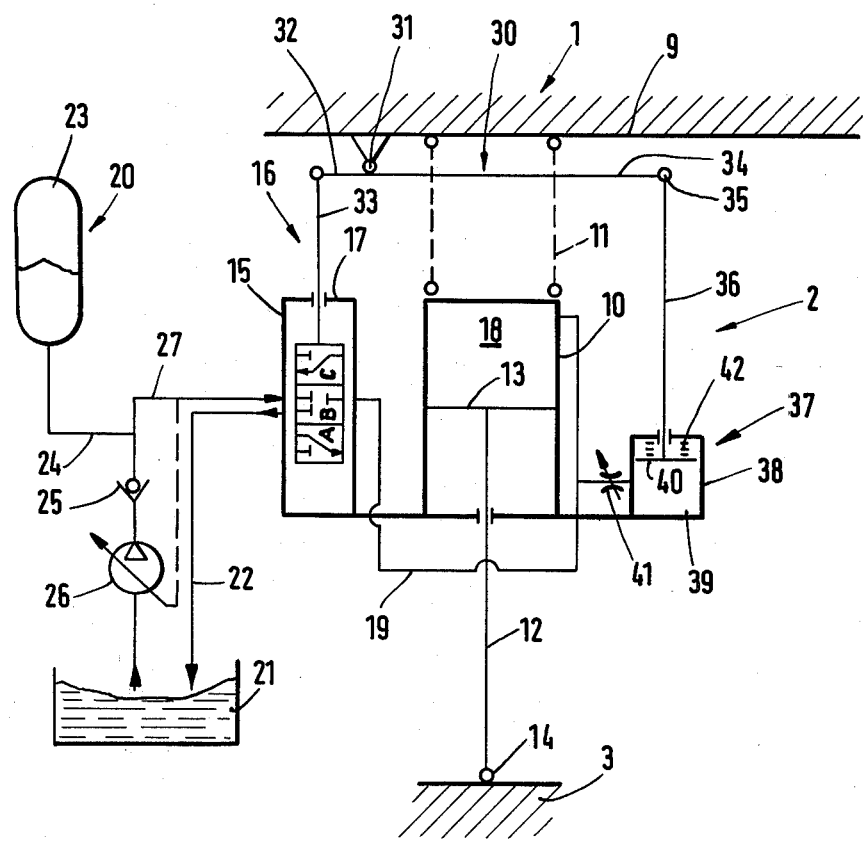
FIG. 2 shows diagrammatically the structure of a support unit according to the invention.

The support unit operates in the following manner: If the driver's cab 1 is subjected to load caused by one or more persons climbing into it, the spring element 11 is compressed and as a result the piston slide valve 17 displaced relative to its housing 15 out of the position shown in FIG. 2 into position C so that the outlet 19 is connected to the return line 22 and the supporting cylinder 10 shortened. At the same time fluid also flows out of the working area 39 of the piston 40 of adjusting cylinder 37 via the throttle 41 so that this cylinder is moved downwardly under the pressure of the spring 42 and as a result lifts, by way of the lever 30, the piston slide valve 17 back into the initial position B, thereby compensating for the static spring deflection of the cab and returning the directional control valve to its starting position. The throttle 41 is designed so that in the event of dynamic loads occurring during vehicle travel it does not admit a sufficient quantity of fluid so that the adjusting cylinder is rendered inoperative for the frequency range in which dynamic loading occurs during travel.

If the tractor passes over rising ground and the supporting cylinder 10 is raised thereby against the driver's cab 1 while the spring element 11 is compressed, the valve housing 15 is displaced relative to the piston slide valve 17 in such a way that its operative position C is reached. This relative movement between the piston slide valve 17 and its housing 15 is assisted by the leverage of lever 30 whose arm 34 is also raised so that there is an immediate response even in the case of a slight relative movement and the outlet 19 is connected to the return line 22 so that the supporting cylinder 10 is partially evacuated and thereby shortened in order to compensate for unevenness of the ground. If, on the other hand, the tractor passes over a pot-hole, the chassis is lowered relative to the driver's cab 1, the support unit 1 also being drawn downward by the piston rod 12 and the piston slide valve 17 thereby moved relative to its housing into position A. This adjustment is effected even when there is the slightest relative movement between driver's cab and chassis as this movement is further assisted by the lever 30. In position A the support cylinder is supplied with hydraulic fluid from the accumulator 23 and as a result extended until the piston slide valve 17 returns to its neutral position, i.e. occupies position B.

The support unit therefore operates with an extremely rapid response and compensates for any relative movement so that the driver's cab is always maintained in the normal position and does not execute any swinging or rocking movements.

As a general principle the piston slide valve 17 could also be attached directly to the driver's cab 1, the embodiment then being designed so that position B is reached during normal static spring deflection.

Various modifications in structure and/or function may be made by one skilled in the art to the disclosed embodiments without departing from the scope of the invention as determined by the claims.

What is claimed is:

1. An apparatus for compensating relative dynamic movement of the passenger space of a vehicle comprising;
    at least one support means mounted to the chassis of the vehicle, the support means having a piston supported by the passenger space by flexible means;
    a fluid circuit providing a source of pressure or a non-pressurized return;
    a directional control means for connecting the pressure side of the piston to either the source of pressure or to the non-pressurized return;
    a lever means supported by the passenger space, the lever means having a first arm means for actuating the directional control means and a second arm means; and
    an adjusting cylinder means having a piston connected to the second arm means, the pressure side of the adjusting cylinder piston being in fluid connection with the pressure side of the support means piston by an adjustable fluid throttling means.

2. The apparatus according to claim 1 wherein the fluid circuit provides a constant pressure.

3. The apparatus according to claim 1 wherein the fluid circuit includes a fluid accumulator.

4. The apparatus according to claim 1 wherein the directional control means includes a slide valve which is responsive to the relative dynamic movement of the passenger space.

5. The apparatus according to claim 4 wherein upon compression of the flexible means the slide valve connects the fluid circuit to the non-pressurized return.

6. The apparatus according to claim 4 wherein upon extension of the flexible means the slide valve connects the fluid circuit to the source of pressure.

7. An apparatus according to claim 1 wherein the directional control means is affixed to the support means.

8. The apparatus according to claim 1 wherein the directional control means is affixed to the passenger space.

9. The apparatus according to claim 1 wherein there are at least two support means, at least one support means located at the front of the passenger space and at least one support means located at the rear of the passenger space.

* * * * *